(12) United States Patent
Cardenas

(10) Patent No.: US 12,433,659 B2
(45) Date of Patent: Oct. 7, 2025

(54) SKIN LESION TREATMENT DEVICE

(71) Applicant: Scapa Tapes North America LLC, Windsor, CT (US)

(72) Inventor: Nohora Cardenas, New Milford, NJ (US)

(73) Assignee: Scapa Tapes North America LLC, Windsor, CT (US)

( * ) Notice: Subject to any disclaimer, the term of this patent is extended or adjusted under 35 U.S.C. 154(b) by 98 days.

(21) Appl. No.: 17/084,739

(22) Filed: Oct. 30, 2020

(65) Prior Publication Data

US 2021/0128218 A1    May 6, 2021

Related U.S. Application Data

(60) Provisional application No. 62/928,130, filed on Oct. 30, 2019.

(51) Int. Cl.
*A61B 18/02* (2006.01)
*A61M 35/00* (2006.01)
*A61B 18/00* (2006.01)

(52) U.S. Cl.
CPC .......... *A61B 18/02* (2013.01); *A61M 35/006* (2013.01); *A61B 2018/00065* (2013.01); *A61B 2018/00452* (2013.01); *A61B 2018/00571* (2013.01); *A61B 2560/04* (2013.01); *A61M 2202/04* (2013.01)

(58) Field of Classification Search
CPC ................ A61B 18/02; A61B 18/0218; A61B 2018/00065; A61B 2018/00452; A61B 2018/00571; A61B 2560/04; A61M 2202/04; A61M 35/003; A61M 35/006

USPC ..................................... 606/21–26
See application file for complete search history.

(56) References Cited

U.S. PATENT DOCUMENTS

| 5,460,620 | A | * | 10/1995 | Smith | A61K 9/7092 604/290 |
|---|---|---|---|---|---|
| 6,092,527 | A | | 7/2000 | Jensma | |
| 7,604,632 | B2 | | 10/2009 | Howlett et al. | |
| 2005/0043723 | A1 | * | 2/2005 | Howlett | A61B 18/0218 606/26 |
| 2006/0189968 | A1 | | 8/2006 | Howlett et al. | |
| 2012/0016356 | A1 | * | 1/2012 | Beale | A61N 5/04 607/101 |
| 2015/0045782 | A1 | | 2/2015 | Ottanelli | |
| 2015/0216722 | A1 | * | 8/2015 | Choate | A61F 9/00772 606/162 |
| 2015/0246212 | A1 | * | 9/2015 | Burstein | A61K 31/19 604/290 |
| 2015/0328259 | A1 | * | 11/2015 | Shanler | A61K 9/08 604/290 |
| 2016/0206295 | A1 | * | 7/2016 | Kramer | A61B 18/02 |
| 2018/0185413 | A1 | | 7/2018 | Shanler et al. | |

FOREIGN PATENT DOCUMENTS

GB    2431108 A    4/2007

* cited by examiner

*Primary Examiner* — Khadijeh A Vahdat
(74) *Attorney, Agent, or Firm* — Farber LLC

(57) ABSTRACT

A device for treating a skin lesion including a container, an applicator tube and an applicator tip, wherein the applicator tube is attached to the container and applicator tip to allow the passage of a skin lesion treatment agent from the container to the applicator tip.

19 Claims, 2 Drawing Sheets

SKIN LESION TREATMENT DEVICE

CROSS-REFERENCE TO RELATED APPLICATIONS

This application claims priority to U.S. Provisional Application No. 62/928,130 filed on Oct. 30, 2019, which is incorporated by reference herein in its entirety.

TECHNICAL FIELD

The present invention relates generally to an applicator tip for use in a device for treating a skin lesion. The present invention further relates to a device for treating a skin lesion, a kit comprising components to make said device, and the use of the device for treating a skin lesion, particularly a wart.

BACKGROUND

Skin lesions are superficial growths or patches of the skin that do not resemble the area surrounding it. Primary skin lesions are variations in colour or texture that may be present at birth or that may be acquired during a person's lifetime (e.g. those associated with infectious diseases, allergic reactions or environmental agents). Secondary skin lesions are those changes in the skin that result from primary skin lesions, either as a natural progression or as a result of a person manipulating it (e.g. scratching).

Warts are a type of primary skin lesion caused by human papillomavirus (HPV) which can enter the body in areas of broken skin, thus infecting the outer layer of the skin. Where infection occurs, the virus causes an excess of keratin, a hard protein, to develop in the epidermis. The extra keratin produces the rough, hard texture of a wart.

A common treatment for warts and other skin lesions involves topically applying a refrigerant to the skin lesion. This freezes the tissue and kills the upper layer of skin. The dead upper layer of tissue can then be removed, allowing the skin to heal and produce healthy tissue. A number of over the counter products are available which have a number of drawbacks. In particular, since warts and other skin lesions present an irregular surface, it is difficult to apply the refrigerant precisely to the wart or skin lesion. Consequently, it is difficult to ensure complete coverage of the wart or skin lesion whilst avoiding application to peripheral healthy tissue.

It is therefore desirable to provide new devices for treating skin lesions, for example by applying a treatment agent such as a refrigerant.

SUMMARY

In accordance with a first aspect of the present invention there is provided a device for treating a skin lesion, wherein the device comprises:
  a container for holding a skin lesion treatment agent;
  an applicator tube; and
  an applicator tip;
  wherein the applicator tube is attached to the container and the applicator tip in a manner to allow passage of a skin lesion treatment agent from the container to the applicator tip;
  wherein the applicator tip is made from a material that absorbs a skin lesion treatment agent; and
  wherein at least part of the exposed surface of the applicator tip is concave.

In accordance with a second aspect of the present invention there is provided a kit for making a device for treating a skin lesion, wherein the kit comprises:
  a container for holding a skin lesion treatment agent;
  an applicator tube configured to hold an applicator tip and to allow passage of a skin lesion treatment agent from the container to the applicator tip; and
  an applicator tip made from a material that absorbs a skin lesion treatment agent;
  wherein at least part of the surface of the applicator tip is concave.

In accordance with a third aspect of the present invention there is provided an applicator tip made from a material that absorbs a skin lesion treatment agent, wherein at least part of the surface of the applicator tip is concave.

In accordance with a fourth aspect of the present invention there is provided a method of treating a skin lesion using the device of the first aspect of the present invention, wherein the method comprises:
  releasing a skin lesion treatment agent from the container through the applicator tube to the applicator tip; and
  contacting the skin lesion with the concave part of the surface of the applicator tip.

In accordance with a fifth aspect of the present invention there is provided the device of the first aspect of the present invention, the kit of the second aspect of the present invention, or the applicator tip of the third aspect of the present invention, for use in a method of treating a skin lesion. The method of treating a skin lesion may, for example, be in accordance with the fourth aspect of the present invention.

In accordance with a sixth aspect of the present invention there is provided a use of an applicator tip of the third aspect of the present invention in the manufacture of a device or kit for treating a skin lesion. The device may be according to the first aspect of the present invention. The kit may be according to the second aspect of the present invention.

In certain embodiments of any aspect of the present invention the skin lesion is a wart.

In certain embodiments of any aspect of the present invention a skin lesion treatment agent is present in the container.

In certain embodiments of any aspect of the present invention the skin lesion treatment agent comprises a refrigerant.

Certain embodiments of the present invention may provide one or more of the following advantages:
  the applicator tip envelops the skin lesion more effectively;
  the applicator tip contacts the skin lesion with minimal compression/pressure;
  higher amount of the skin lesion treatment agent is applied to the skin lesion;
  lower amount of the skin lesion treatment agent is applied to healthy skin;
  provision of a device that is easier to use;
  provision of an interface more conducive to the shape of the skin lesion;
  provision of increased surface area of the interface improving overall coverage of the skin lesion surface.

The details, examples and preferences provided in relation to any particular one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

BRIEF DESCRIPTION OF THE FIGURES

The present invention may be defined with reference to following non-limiting Figures in which.

DETAILED DESCRIPTION

Figure 1:
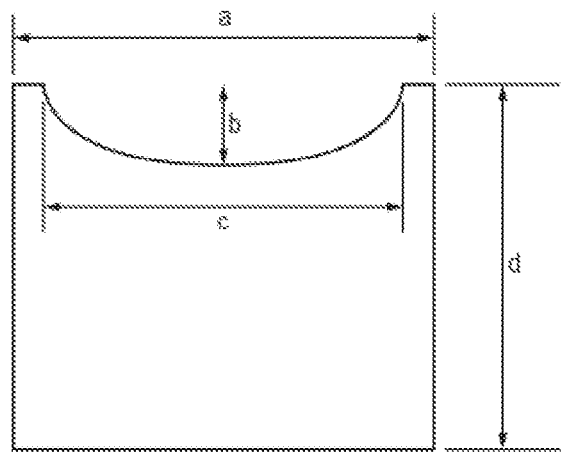
FIG. 1 shows a cross section of a cylindrical applicator tip, wherein the concave part of the surface of the applicator tip is a single curved face at the end of the applicator tip.
Figure 2:
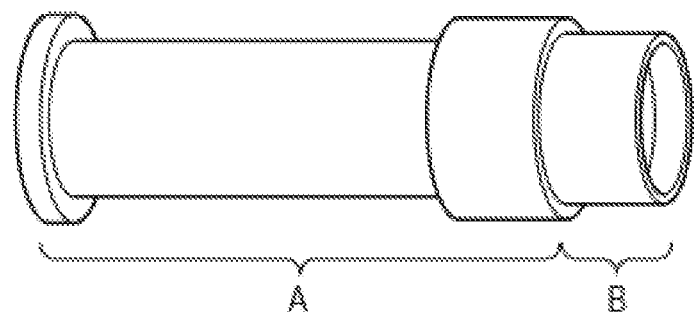
FIG. 2 shows an example of an applicator tube connected to an applicator tip. Part A is the applicator tube and part B is the applicator tip.

It has surprisingly and advantageously been found that an applicator tip made from a material that absorbs a skin lesion treatment agent can provide improved application of the skin lesion treatment agent to the skin lesion when a concave part of the surface of the applicator tip is contacted with the skin lesion.

There is therefore provided herein an applicator tip made from a material that absorbs a skin lesion treatment agent, wherein at least part of the surface of the applicator tip is concave. There is further provided herein a device for treating a skin lesion and a kit for making said device, wherein the device or kit comprises said applicator tip. In addition, there is provided herein the various uses of said applicator tip for making a device or kit for treating a skin lesion and in a method for treating a skin lesion.

Applicator Tip

The applicator tips described herein are made from a material that absorbs a skin lesion treatment agent. By "absorbs" it is meant that the material allows the skin lesion treatment agent to be soaked up by or taken into the material. The skin lesion treatment agent may be taken into the material of the applicator tip when released from the container such that when the applicator tip is contacted with the skin lesion at least some of the skin lesion treatment agent will contact the skin lesion (e.g. when the applicator tip is saturated with the skin lesion treatment agent). Where the skin lesion treatment agent is a refrigerant, the skin lesion treatment agent may be taken into the material of the applicator tip to cool the applicator tip to a temperature that will freeze the skin lesion when put in contact with the applicator tip.

The applicator tip may, for example, be able to absorb at least about 20% or at least about 30% or at least about 40% or at least about 50% or at least about 60% or at least about 70% or at least about 80% or at least about 90% or at least about 100% of its weight in skin lesion treatment agent. For example, the applicator tip may be able to absorb up to about 500% or up to about 450% or up to about 400% or up to about 350% or up to about 300% or up to about 250% or up to about 200% of its weight in skin lesion treatment agent. Absorption of the skin lesion treatment agent refers to absorption of the skin lesion treatment agent in the form in which it is provided in the container of the device (e.g. including any carriers (e.g. water) that may be present with the actual active agent).

At least part of the surface of the applicator tip is concave. The "surface" of the applicator tip refers to the outermost layer of the applicator tip that defines the boundary of the applicator tip.

By "concave" it is meant that at least part of the surface is shaped inwardly to the applicator tip such that a hollow or indent is made in the applicator tip. The concave nature of the applicator tip is formed by shaping the material of the applicator tip and does not refer to any natural shape of the material from which the applicator tip is made. For example, where an applicator tip is made from a porous material, any pores on the surface of the applicator tip are not considered to be concave in the present context. For example, the concave part of the applicator tip may be visible to the naked eye, for example, by a person having 20/20 vision when the applicator tip is 20 cm from the eyes.

At least one part of the surface of the applicator tip is concave. For example, only one part of the surface of the applicator tip may be concave.

For example, two or more parts of the surface of the applicator tip may be concave. For example, up to four or up to three parts of the applicator tip may be concave.

In the devices described herein, the applicator tips are attached to the applicator tubes described herein. Thus, part of the surface of the applicator tip may be in direct contact with the device and consequently may not be exposed to the atmosphere. It is intended that the concave part of the surface of the applicator tip will be contacted with the skin lesion when the device is in use. Therefore, the concave part of the surface of the applicator tip should be exposed when the applicator tip is in an assembled device. By "exposed" it is means that the concave part of the surface is in contact with the atmosphere when the applicator tip is in an assembled device.

The concave part of the surface of an applicator tip may be located in a position on the applicator tip such that it can be contacted with a skin lesion. For example, the concave part of the surface of the applicator tip may be located in a position such that it can be contacted with a skin lesion without any other part of the device and/or any other part of the applicator tip from contacting the skin lesion and/or the skin.

For example, the concave part of the surface of an applicator tip may be located at the end of the applicator tip. The "end" of the applicator tip may refer to a part of the applicator tip that connects the longest planes of the applicator tip. The "end" of the applicator tip may refer to a part of the applicator tip that is located furthest from the applicator tube when the applicator tip is connected to the applicator tube. The "end" of the applicator tip may be in-line with the length of the applicator tube (i.e. not positioned laterally). For example, where the applicator tip is a cylinder and is inserted into a cylindrical applicator tube, the flat circular face of the cylinder that is exposed to the atmosphere is the "exposed end" of the applicator tip.

The concave part of the surface of an applicator tip may, for example comprise, consist essentially of or consist of a single curved face. For example, the concave part of the surface of an applicator tip may be a single curved face. In other words, the concave part of the surface of an applicator tip may have the shape of the inside of part of a sphere or ovoid.

The concave part of the surface of an applicator tip may, for example, comprise, consist essentially of or consist of a plurality of flat faces. For example, the concave part of the surface of an applicator tip may be a plurality of flat faces. The flat faces may have any suitable geometry. For example, the flat faces may be polygons such as triangles, squares, rectangles, pentagons, hexagons, heptagons, octagons, nonagons or decagons. A number of flat faces may be assembled in any suitable three-dimensional shape. For example, the flat faces may be assembled such that the concave part of the surface of the applicator tip has the shape of a cube, a cuboid, a prism (e.g. a triangular prism, a pentagonal prism or a hexagonal prism), a cone or a pyramid (e.g. a triangular pyramid, a pentagonal pyramid or a hexagonal pyramid).

The concave part of the surface of an applicator tip may, for example, comprise, consist essentially of or consist of one or more curved faces and one or more flat faces. For example, the concave part of the surface of an applicator tip may be made up of one flat face and one curved face. The flat face may, for example, be circular or oval and the curved face may be perpendicular to the flat face. For example, the faces may be assembled such that the concave part of the surface of the applicator has the shape of a cylinder or elliptical cylinder.

The applicator tip may, for example, have the overall shape of a cylinder, an elliptical cylinder, a cube, a cuboid, a prism (e.g. a triangular prism, a pentagonal prism or a hexagonal prism), a cone or a pyramid (e.g. a triangular pyramid, a pentagonal pyramid or a hexagonal pyramid). For example, the applicator tip may have the overall shape of a cylinder, a cuboid or a prism (e.g. a triangular prism, a pentagonal prism or a hexagonal prism). By "overall shape" it is meant the shape of the applicator tip without taking into account the concave part of the surface of the applicator tip.

The dimensions of an applicator tip may be suitable for contacting a skin lesion of a subject.

The applicator tip may, for example have a length equal to or greater than about 0.5 cm. For example, the applicator tip may have a length equal to or greater than about 0.6 cm or equal to or greater than about 0.7 cm or equal to or greater than about 0.8 cm or equal to or greater than about 0.9 cm or equal to or greater than about 1.0 cm or equal to or greater than about 1.1 cm.

The applicator tip may, for example, have a length equal to or less than about 2.0 cm. For example, the applicator tip may have a length equal to or less than about 1.9 cm or equal to or less than about 1.8 cm or equal to or less than about 1.7 cm or equal to or less than about 1.6 cm or equal to or less than about 1.5 cm or equal to or less than about 1.4 cm or equal to or less than about 1.3 cm.

For example, the applicator tip may have a length ranging from about 0.5 cm to about 2.0 cm or from about 0.7 cm to about 1.8 cm or from about 0.9 cm to about 1.6 cm or from about 1.0 cm to about 1.5 cm or from about 1.1 cm to about 1.3 cm. For example, the applicator tip may have a length ranging from about 1.0 cm to about 1.5 cm.

The length of the applicator tip refers to the longest dimension of the applicator tip.

The applicator tip may, for example, have a width equal to or greater than about 0.4 cm. For example, the applicator tip may have a width equal to or greater than about 0.5 cm or equal to or greater than about 0.6 cm.

The applicator tip may, for example, have a width equal to or less than about 0.9 cm. For example, the applicator tip may have a width equal to or less than about 0.8 cm or equal to or less than about 0.7 cm.

For example, the applicator tip may have a width ranging from about 0.4 cm to about 0.9 cm or from about 0.5 cm to about 0.8 cm or from about 0.5 cm to about 0.7 cm or from about 0.6 cm to about 0.7 cm. For example, the applicator tip may have a width ranging from about 0.5 cm to about 0.7 cm.

The width of the applicator tip may be equal to or less than the length of the applicator tip. For example, the width of the applicator tip may be less than the length of the applicator tip.

The width of the applicator tip refers to the widest dimension of the applicator tip. Where the applicator tip has the overall shape of a cylinder, the width of the applicator tip is the diameter of the circular cross section of the applicator tip.

The depth of the concave part of the surface of the applicator tip may, for example, be equal to or greater than about 0.1 cm. For example, the depth of the concave part of the surface of the applicator tip may be equal to or greater than about 0.2 cm or equal to or greater than about 0.3 cm or equal to or greater than about 0.4 cm.

The depth of the concave part of the surface of the applicator tip may, for example, be equal to or less than about 1.0 cm. For example, the depth of the concave part of the surface of the applicator tip may be equal to or less than about 0.9 cm or equal to or less than about 0.8 cm or equal to or less than about 0.7 cm or equal to or less than about 0.6 cm or equal to or less than about 0.5 cm.

For example, the depth of the concave part of the surface of the applicator tip may range from about 0.1 cm to about 1.0 cm or from about 0.2 cm to about 0.8 cm or from about 0.2 cm to about 0.5 cm or from about 0.2 cm to about 0.4 cm. For example, the depth of the concave part of the surface of the applicator tip may range from about 0.2 cm to about 0.5 cm.

The depth of the concave part of the surface of the applicator tip refers to the distance between the most inward point of the concave part of the surface of the applicator tip to the point where the surface of the applicator tip would be if the parts of the surface of the applicator tip adjacent to the concave part of the surface of the applicator tip were joined by a flat surface.

The width of the concave part of the surface of the applicator tip may, for example, be equal to or greater than about 0.2 cm. For example, the width of the concave part of the surface of the applicator tip may be equal to or greater than about 0.3 cm or equal to or greater than about 0.4 cm or equal to or greater than about 0.5 cm or equal to or greater than about 0.6 cm.

The width of the concave part of the surface of the applicator tip may, for example, be equal to or less than about 0.9 cm. For example, the width of the concave part of the surface of the applicator tip may be equal to or less than about 0.8 cm or equal to or less than about 0.7 cm or equal to or less than about 0.6 cm or equal to or less than about 0.5 cm.

For example, the width of the concave part of the surface of the applicator tip may range from about 0.2 cm to about 0.9 cm or from about 0.2 cm to about 0.7 cm or from about 0.2 cm to about 0.6 cm or from about 0.3 cm to about 0.7 cm or from about 0.3 cm to about 0.6 cm. For example, the width of the concave part of the surface of the applicator tip may range from about 0.3 cm to about 0.6 cm.

The width of the concave part of the surface of the applicator tip refers to the widest dimension of the concave part of the surface of the applicator tip. Where the concave part of the surface of the applicator tip has a circular cross section, the width of the concave part of the surface of the applicator tip refers to the diameter of the circular cross section.

FIG. 1 shows a cross section of a cylindrical applicator tip, wherein the concave part of the surface of the applicator tip is a single curved face at the end of the applicator tip. The dimension "a" refers to the width of the applicator tip. The dimension "b" refers to the depth of the concave part of the surface of the applicator tip. The dimension "c" refers to the width of the concave part of the surface of the applicator tip. The dimension "d" refers to the length of the applicator tip.

The applicator tip may be made by any material suitable to absorb the skin lesion treatment agent. For example, the applicator tip may be made by any material suitable to absorb the skin lesion treatment agent and allow the skin lesion treatment agent to contact the skin lesion when the applicator tip contacts the skin lesion.

It is desirable for the applicator tip to be made from a material that has a degree of compressibility to assist in releasing the skin lesion treatment agent from the applicator tip when contacted with the skin lesion, but also having a degree of rigidity to avoid deformation of the applicator tip resulting in the applicator tip contacting healthy skin and/or to avoid too much skin lesion treatment agent from being released from the applicator tip which may result in skin lesion treatment agent contacting healthy skin.

The applicator tip may, for example, be made from a compressible material. The applicator tip may, for example, be made from a resilient material. The applicator tip may, for example, be made from a compressible and resilient material. By "compressible" it is meant that it is possible to make the material more compact by applying a force. By "resilient" it is meant that the material resumes its original shape after compression once the force used to compress the material is removed.

The applicator tip may, for example, include areas of compromise, for example on the concave part of the surface of the applicator tip, which allow the compressibility of the applicator tip to be modulated. These could be in the form of slits or perforations, or could include a reduction in material density, or could include an increase in pore volume.

The applicator tip may, for example, be made from a porous material. This may allow the skin lesion treatment agent to enter the pores of the material and thus be absorbed by the material of the applicator tip. The skin lesion treatment agent may then be released from the pores of the material when the applicator tip is compressed, for example upon contact with a skin lesion.

The applicator tip or material used to make the applicator tip may, for example, have a pore volume equal to or greater than about 10%. For example, the applicator tip or material used to make the applicator tip may have a pore volume equal to or greater than about 15% or equal to or greater than about 20% or equal to or greater than about 25% or equal to or greater than about 30% or equal to or greater than about 35% or equal to or greater than about 40% or equal to or greater than about 45% or equal to or greater than about 50% or equal to or greater than about 55% or equal to or greater than about 60% or equal to or greater than about 65% or equal to or greater than about 70% or equal to or greater than about 75% or equal to or greater than about 80%.

The applicator tip or material used to make the applicator tip may, for example, have a pore volume equal to or less than about 90%. For example, the applicator tip or material used to make the applicator tip may have a pore volume equal to or less than about 85% or equal to or less than about 80% or equal to or less than about 75% or equal to or less than about 70%.

The applicator tip or material used to make the applicator tip may, for example, have a pore volume ranging from about 10% to about 90% or from about 30% to about 90% or from about 50% to about 90% or from about 70% to about 90% or from about 75% to about 85%. For example, the applicator tip or material used to make the applicator tip may have a pore volume ranging from about 75% to about 85%.

The applicator tip or material used to make the applicator tip may, for example, have a mean pore size equal to or less than about 500 μm. For example, the applicator tip or material used to make the applicator tip may have a mean pore size equal to or less than about 450 μm or equal to or less than about 400 μm or equal to or less than about 350 μm or equal to or less than about 300 μm or equal to or less than about 250 μm or equal to or less than about 200 μm or equal to or less than about 150 μm or equal to or less than about 100 μm.

The applicator tip or material used to make the applicator tip may, for example, have a mean pore size equal to or greater than about 1 μm. For example, the applicator tip or material used to make the applicator tip may have a mean pore size equal to or greater than about 5 μm or equal to or greater than about 10 μm or equal to or greater than about 20 μm.

For example, the applicator tip or material used to make the applicator tip may have a mean pore size ranging from about 1 μm to about 500 μm or from about 5 μm to about 300 μm or from about 10 μm to about 200 μm or from about 20 μm to about 100 μm.

The pore volume and average pore size of the applicator tip or material used to make the applicator tip may, for example, be measured by optical microscopy and using image analysis software (e.g. to measure the ratio of open area versus that occupied by fibres). An example of software that may be used is MATLAB.

The density of the applicator tip or material used to make the applicator tip may, for example be equal to or greater than about 0.1 g/cm$^3$. For example, the density of the applicator tip or material used to make the applicator tip may be equal to or greater than about 0.2 g/cm$^3$ or equal to or greater than about 0.3 g/cm$^3$ or equal to or greater than about 0.4 g/cm$^3$.

The density of the applicator tip or material used to make the applicator tip may, for example be equal to or less than about 0.8 g/cm$^3$. For example, the density of the applicator tip or material used to make the applicator tip may be equal to or less than about 0.7 g/cm$^3$ or equal to or greater than about 0.6 g/cm$^3$ or equal to or greater than about 0.5 g/cm$^3$ or equal to or less than about 0.4 g/cm$^3$ or equal to or less than about 0.3 g/cm$^3$.

For example, the density of the applicator tip or material used to make the applicator tip may be from about 0.1 g/cm$^3$ to about 0.8 g/cm$^3$ or from about 0.1 g/cm$^3$ to about 0.6 g/cm$^3$ or from about 0.1 g/cm$^3$ to about 0.4 g/cm$^3$.

The density of the applicator tip or material used to make the applicator tip refers to the uncompressed whole volume of the applicator tip or material used to make the applicator tip. Thus, the space occupied by any pores in a porous material is included in the density calculation.

The applicator tip may, for example, be made from a hydrophilic material. By "hydrophilic" it is meant that the material has the capacity to absorb water. For example, the applicator tip may be able to absorb at least about 20% or at least about 30% or at least about 40% or at least about 50% or at least about 60% or at least about 70% or at least about 80% or at least about 90% or at least about 100% of its weight in water. For example, the applicator tip may be able to absorb up to about 500% or up to about 450% or up to about 400% or up to about 350% or up to about 300% or up to about 250% or up to about 200% of its weight in water.

The applicator tip may, for example, be made from a foam material (e.g. open cell or closed cell foam), a sponge material, a non-woven material, a woven or knitted fabric, a spacer material, a sintered thermoplastic, a sintered metal, a glass or ceramic frit, or a combination thereof. For example, the applicator tip may be made from a foam material (e.g. a polymeric foam material), a non-woven material, a woven or knitted fabric, a spacer material, or a combination thereof. For example, the applicator tip may be made from a single material. A spacer material is a porous material that comprises two woven or knitted fabric layers connected by spacer yarns or fibres.

The applicator may, for example, be made from any suitable fibres, including, for example, polymeric fibres such as polyester, cotton fibres or cellulose fibres.

The applicator tip may, for example, be made from a non-woven material comprising a blend of polymer fibres. For example, the polymer fibres may comprise, consist essentially of or consist of polyolefin fibres and polyester fibres.

The applicator tip may, for example, be permanently or reversibly attached to the applicator tube. By "permanent" it is meant that it is not intended for the user of the skin lesion treatment device to be able to remove the applicator tip from the applicator tube.

The applicator tip may, for example, be permanently attached to the applicator tube by thermal welding, ultrasonic welding, an adhesive, radio frequency (RF) welding, or mechanical fastening.

The applicator tip may, for example, be reversibly attached to the applicator tube by mechanical fastening (e.g. hook and loop (Velcro) fastening).

Applicator Tube

The applicator tube is a hollow structure that has a channel extending therethrough to allow the passage of the skin lesion treatment agent from the container to the applicator tip. The applicator tube is therefore suitable for attachment to the container and to the applicator tip.

The shape of the channel of the applicator tube may, for example, be similar to or the same as the overall shape of the applicator tip. For example, the shape of the channel of the applicator tube may be a cylinder, an elliptical cylinder, a cube, a cuboid, a prism (e.g. a triangular prism, a pentagonal prism or a hexagonal prism), a truncated cone or a pyramid (e.g. a triangular pyramid, a pentagonal pyramid or a hexagonal pyramid). For example, the shape of the channel of the applicator tube may be a cylinder or elliptical cylinder.

The width of the channel of the applicator tube may, for example, be equal to or less than the width of the applicator tip to ensure that the applicator tip can be attached to the applicator tube securely. For example, where the applicator tip is made from a compressible material, the width of the channel of the applicator tube may be less than the width of the applicator tip.

The channel of the applicator tube may, for example, have one or more projections extending into the channel to assist in holding an applicator tip securely in the applicator tube. The channel of the applicator tube may, for example, have a width that is larger than the width of the applicator tip if the distance between two projections or one projection and the wall of the channel is equal to or less than the width of the applicator tip.

The overall shape of the applicator tube may, for example, be similar to or the same as the overall shape of the applicator tip. For example, the overall shape of the applicator tube may be a cylinder, an elliptical cylinder, a cube, a cuboid, a prism (e.g. a triangular prism, a pentagonal prism or a hexagonal prism), a truncated cone or a pyramid (e.g. a triangular pyramid, a pentagonal pyramid or a hexagonal pyramid). For example, the overall shape of the applicator tube may be a cylinder or elliptical cylinder. The "overall shape" of the applicator tube refers to the shape of the applicator tube not taking into account the hollow channel extending therethrough.

The applicator tube may, for example, also have a securing mechanism for attaching the applicator tube to the container. This may, for example, comprise a threading mechanism to couple to a threading mechanism on the container.

The applicator tube may, for example, be made from a molded thermoplastic material, for example polyethylene, polypropylene, or other polyolefins and polyolefin copolymers, nylons, polyesters, polyacetals, and polyurethanes.

The applicator tube may be permanently or reversibly attached to the container. By "permanent" it is meant that it is not intended for the user of the skin lesion treatment device to be able to remove the applicator tip from the applicator tube. The applicator tube may, for example, be an inherent part of the container. For example, where the container and applicator tube may be made from the same or different molded thermoplastic material and the container and the applicator tube may be made as a single piece of molded plastic. For example, an adhesive may be used to permanently attach the applicator tube to the container.

The applicator tube may, for example, have a length equal to or greater than the length of the applicator tip, for example greater than the length of the applicator tip.

The applicator tube may, for example, have a length equal to or greater than about 0.5 cm. For example, the applicator tube may have a length equal to or greater than about 0.6 cm or equal to or greater than about 0.8 cm or equal to or greater than about 1.0 cm or equal to or greater than about 1.2 cm or equal to or greater than about 1.4 cm or equal to or greater than about 1.5 cm or equal to or greater than about 1.6 cm or equal to or greater than about 1.8 cm or equal to or greater than about 2.0 cm.

The applicator tube may, for example, have a length equal to or less than about 4.0 cm. For example, the applicator tube may have a length equal to or less than about 3.8 cm or equal to or less than about 3.6 cm or equal to or less than about 3.5 cm or equal to or less than about 3.4 cm or equal to or less than about 3.2 cm or equal to or less than about 3.0 cm or equal to or less than about 2.8 cm or equal to or less than about 2.6 cm or equal to or less than about 2.5 cm.

For example, the applicator tube may, for example, have a length ranging from about 0.5 cm to about 4.0 cm or from about 1.0 cm to about 3.5 cm or from about 1.5 cm to about 3.0 cm or from about 2.0 cm to about 3.0 cm.

The length of the applicator tube refers to the longest dimension of the applicator tube.

The applicator tube may, for example, have a width equal to or greater than about 0.4 cm. For example, the applicator tube may have a width equal to or greater than about 0.5 cm or equal to or greater than about 0.6 cm or equal to or greater than about 0.7 cm or equal to or greater than about 0.8 cm.

The applicator tube may, for example, have a width equal to or less than about 1.5 cm. For example, the applicator tube may have a length equal to or less than about 1.4 cm or equal to or less than about 1.2 cm or equal to or less than about 1.0 cm or equal to or less than about 0.8 cm or equal to or less than about 0.6 cm.

For example, the applicator tube may, for example, have a width ranging from about 0.4 cm to about 1.5 cm or from about 0.4 cm to about 1.0 cm or from about 0.5 cm to about 1.0 cm or from about 0.5 cm to about 0.8 cm.

The width of the applicator tube refers to the widest dimension of the applicator tube. Where the applicator tube has the overall shape of a cylinder, the width of the applicator tube is the diameter of the circular cross section of the applicator tube.

The channel of the applicator tube may, for example, have a width equal to or greater than about 0.4 cm. For example, the channel of the applicator tube may have a width equal to or greater than about 0.5 cm or equal to or greater than about 0.6 cm.

The channel of the applicator tube may, for example, have a width equal to or less than about 0.9 cm. For example, the channel of the applicator tube may have a width equal to or less than about 0.8 cm or equal to or less than about 0.7 cm.

For example, the channel of the applicator tube may have a width ranging from about 0.4 cm to about 0.9 cm or from about 0.5 cm to about 0.8 cm or from about 0.5 cm to about 0.7 cm or from about 0.6 cm to about 0.7 cm. For example, the channel of the applicator tube may have a width ranging from about 0.5 cm to about 0.7 cm.

The width of the channel of the applicator tube refers to the widest dimension of the channel of the applicator tube. Where the channel of the applicator tube has the overall shape of a cylinder, the width of the channel of the applicator tube is the diameter of the circular cross section of the channel of the applicator tube.

Container

The container is any structure capable of holding a skin lesion treatment agent. In certain embodiments, a skin lesion treatment agent is present in the container. The container may, for example, be completed closed except for the applicator tube described herein—in other words the applicator tube is the only point at which the skin lesion treatment agent can exit the container.

The container may, for example, be a pressurized container.

The container may, for example, comprise a trigger that causes release of the skin lesion treatment agent from the container through the applicator tube when activated.

The container may, for example, also have a securing mechanism for attaching the applicator tube to the container. This may, for example, comprise a threading mechanism to couple to a threading mechanism on the applicator tube.

The container may, for example, be made from a molded thermoplastic material, for example polyethylene, polypropylene, or other polyolefins and polyolefin copolymers, nylons, polyesters, polyacetals, and polyurethanes.

Other Details of the Device

The device may, for example, be in accordance with one or more parts of the device described in US 2006/0189968 A1, the contents of which are incorporated herein by reference, except that at least one part of the surface of the applicator tips described herein is concave.

The devices described herein may be for use with an aerosol container of the type having a valve and a stem extending outward from the valve and the container. The container may, for example, hold a propellant refrigerant therein. The device may include an actuator adapted to sit on a stem of the valve in order to depress the stem and release refrigerant from the container. The actuator may include an outlet tube for receiving the released refrigerant from the container. A hub may be adapted to mount on the container, the hub including at least one opening therein and a first aligning arrangement. An applicator tube may be mounted to the hub in fluid communication with the outlet tube of the actuator, and the applicator tip is mounted to a distal end of the applicator tube for receiving the skin lesion treatment agent. A base may have a central opening for receiving the hub and applicator tube therein. The base may include at least one key and a second aligning arrangement for cooperating with the first aligning arrangement such that the at least one key enters the at least one opening in the hub to engage and apply pressure to the actuator to cause the actuator to depress the valve stem and release the refrigerant.

The actuator may include an inlet tube connected with the main body and adapted to receive the stem of the valve therein, and a main body that connects together the inlet tube and the outlet tube in fluid communication with each other. The main body may include an arrangement for limiting insertion of the stem into the inlet tube, and an actuating surface against which at least one key engages, such that application of the pressure to the actuating surface causes the actuator to move such that the shoulder engages and depresses the stem to release the skin lesion treatment agent. The main body may include a generally cylindrical side wall, a bottom wall which closes the side wall and which includes an opening, with the inlet tube and outlet tube being connected to opposite sides of the bottom wall in surrounding relation to the opening therein, and a ledge connected with an upper edge of the side wall, the ledge defining the actuating surface. The main body may further include reinforcing ribs on an outer surface of the side wall and connected with the ledge.

The applicator tube may include an enlarged diameter section at a distal end thereof for receiving the applicator tip therein. The hub may include a securing arrangement for releasably securing the applicator tube thereto. Specifically, the applicator tube may include at least one projection extending outwardly from a lower end thereof, and the securing arrangement may include a threaded securing arrangement for threadedly receiving the at least one projection of the applicator tube in a releasable securing manner. The threaded securing arrangement may include an annular boss extending from an upper surface of the hub, a tube coaxially positioned within the annular boss and connected with the annular boss at a lower end thereof, and at least one helical thread on an inner surface of the annular boss for receiving the at least one projection in a threaded releasable securing manner. The tube of the hub may be in axial alignment with the applicator tube and the outlet tube of the actuator. The hub may include a cylindrical side wall, and a top wall that closes an upper end of the cylindrical side wall, the top wall having an opening therein and the annular boss extends from an underside of the top wall as the upper surface of the hub in surrounding relation to the opening therein. Further, the at least one opening may be in the top wall. In one embodiment, the applicator tube further includes a plurality of grooves through which the refrigerant flows.

The hub may also include a securing arrangement at a lower end of the cylindrical side wall adapted to be snap-fit secured over an upper annular lip of the container.

The first aligning arrangement may include at least one aligning rib on the cylindrical side wall, and the second aligning arrangement may include at least one recess for receiving the at least one aligning rib to angularly align the hub with the base. The opening in the base may be closed by a lower wall at a lower end thereof.

The base may include at least one inwardly extending projection, each having an upper surface on which one the key is mounted, and each the upper surface defining a limit as to an extent to which the hub can be inserted into the base.

For example, there can be three projections and keys of the base and three openings of the hub.

In accordance with another embodiment, the device includes a container for holding a skin lesion treatment agent such as a propellant refrigerant, the container including a valve and a stem extending out from the valve and the container; an actuator seated on the stem of the valve in order to depress the stem and release the refrigerant from the container, the actuator including an outlet tube for receiving the released refrigerant from the container; a hub mounted on the container, the hub including at least one opening therein and a first aligning arrangement; an applicator tube mounted to the hub in fluid communication with the outlet tube of the actuator; a applicator tip mounted to a distal end of the applicator tube to be contacted by the skin lesion treatment agent; and a base having a central opening for receiving the hub and applicator tube therein, the base including at least one key and a second aligning arrangement for cooperating with the first aligning arrangement such that the at least one key enters the at least one opening in the hub to engage and apply pressure to the actuator to cause the actuator to depress the stem and release the refrigerant.

Those of ordinary skill in the art will find alternative ways for operating the device of the invention based on the description of the device in this application. Such methods are contemplated to be within the scope of the invention. For example, the device can be operated in a way that does not require the use of an applicator tube mounted to the hub. In one embodiment of such a method, the device is operated the same as described previously, but without the applicator tube mounted to the hub, and the skin lesion treatment agent such as a liquid refrigerant is dispersed directly into the base where it collects in a pool. A separate applicator, for example an applicator that will withstand the temperatures of the liquid refrigerant, for example a metal or polymer rod, with or without a applicator tip, can then be immersed in the skin lesion treatment agent such as refrigerant, for example to be chilled to a therapeutically effective temperature, and then applied to a lesion.

Uses of the Applicator Tip and the Device

There is further provided herein the various uses of the devices, kits and applicator tips described herein.

In particular, the devices may be used in a method of treating a skin lesion. The skin lesion may, for example, be present on a mammalian subject such as a human. The methods of treatment may, for example, comprise releasing the skin lesion treatment agent from the container through the applicator tube to the applicator tip followed by contacting the skin lesion with the concave part of the surface of the applicator tip.

The applicator tips and kits described herein may, for example, be used in the manufacture of a device for treating a skin lesion.

The term "skin lesion" refers to a superficial growth or patch of the skin that does not resemble the area surrounding it. Primary skin lesions are variations in colour or texture that may be present at birth or that may be acquired during a person's lifetime (e.g. those associated with infectious diseases, allergic reactions or environmental agents). Secondary skin lesions are those changes in the skin that result from primary skin lesions, either as a natural progression or as a result of a person manipulating it (e.g. scratching).

Examples of skin lesions that may be treated using the devices described herein include, for example, warts (including verrucas/plantar warts, periungual warts, and verruca vulgaris/common wart), keratoses, achrocordon, molluscum contagiosum, age spots, dermatofibroma, keloids, granuloma annulare, porokeratosis plantaris, angiomas, lentigo maligna, keratocanthoma, basal cell, Bowen's disease, lentigo discreta, chondrodermatitis, epithelial nevus, leokoplakia, granuloma pyogenicum, moles, nodules, skin tags, and Kaposi's sarcoma. In particular, the skin lesion may be selected from warts, keratosis, age spots, dermatofibroma, keloid scars, angiomas, achrocordon, chondrodermatitis, epithelial nevus and granuloma pyogenicum.

In particular embodiments, the devices described herein are for use in treating warts. Warts are a type of primary skin lesion caused by human papillomavirus (HPV) which can enter the body in areas of broken skin, thus infecting the outer layer of the skin. Where infection occurs, the virus causes an excess of keratin, a hard protein, to develop in the epidermis. The extra keratin produces the rough, hard texture of a wart.

The skin lesion treatment agent may be any composition suitable for treating a skin lesion when contacted with the skin lesion.

Examples of skin lesion treatment agents include refrigerants, compositions comprising salicyclic acid, cantharidin, imiquimod, candidin, bleomycin, formaldehyde, glutaraldehyde and silver nitrate.

In particular, the skin lesion treatment agent may be a refrigerant, for example a liquid refrigerant. The refrigerant freezes the tissue and kills the upper layer of skin. The dead upper layer of tissue can then be removed, allowing the skin to heal and produce healthy tissue.

Any refrigerant suitable to reduce the temperature of wart tissue to a temperature to freeze the skin such that permanent, irreversible rupture of cellular membranes of cells of the skin lesion occurs while the refrigerant is evaporating may be used. If the temperature of a wart is lowered below about −20° C. for at least about twenty seconds, the wart tissue will be destroyed. Many low-boiling refrigerant/aerosol materials are suitable for this purpose Examples of refrigerants include, for example, halogenated hydrocarbons, ethers and hydrocarbons. For environmental reasons, the formerly very common chlorofluorocarbon refrigerants have been prohibited for most uses, generally replaced by fluorohydrocarbon compounds. For example, the commercial refrigerant 1,1,1,2-tetrafluoroethane, which has a boiling point of −26.5° C. may be used. Mixtures of refrigerant compounds may be used, for example to lower the internal pressure of the container or to achieve a desired boiling point. Examples of mixtures are 82 wt % dimethyl ether and 18 wt % propane; 95 wt % dimethyl ether, 2 wt % propane and 3 wt % isobutene; 75 wt % dimethyl ether and 25 wt % propane.

The skin lesion treatment agent may be released from the container in an amount to saturate the applicator tip (i.e. so that the applicator tip cannot absorb any further skin lesion treatment agent).

The applicator tip may then be contacted with the skin lesion for an amount of time suitable to treat the skin lesion. For example, the applicator tip may be contacted with the skin lesion for at least about 2 second or at least about 5 seconds or at least about 10 seconds. For example, the applicator tip may be contacted with the skin lesion for up to about 60 seconds or up to about 50 seconds or up to about 40 seconds or up to about 30 seconds or up to about 20 seconds.

The device can be used to treat a skin lesion, by: mounting an applicator tube and applicator tip assembly to the hub, positioning the device over the base such that the base is located below the container and the applicator tip extends downwardly into a central opening of the base; applying a force to the container, the base, or both, such that the keys enter corresponding openings in the hub to apply pressure to the actuator and cause skin lesion treatment agent such as refrigerant to be released into the applicator tube; discontinuing the force after a period of time sufficient for the liquid refrigerant to be absorbed by the applicator tip or chill the applicator tip to a therapeutically effective temperature; removing the base; and, without removing the applicator tube and applicator tip from the hub, promptly placing the concave part of the surface of the applicator tip in contact with the skin lesion.

Methods of Making the Applicator Tip and the Device

There is also provided herein methods of making the applicator tips and methods for making the devices described herein.

The devices described herein may, for example, be made by attaching an applicator tube to a container and attaching an applicator tip to the applicator tube in any order.

The applicator tips described herein may, for example, be made by moulding a material into a desired shape. The applicator tips described herein may, for example, be made by depositing fibres in a mould having the desired shape of the applicator tip and then bonding the fibres together, for example by chemical, mechanical, heat or solvent treatment. The applicator tips described herein may, for example, be made by obtaining or making the material from which the applicator tip is to be made and then cutting the material into the desired shape and dimensions.

EXAMPLES

Example 1—Manufacture of Applicator Tip

Figure 3:
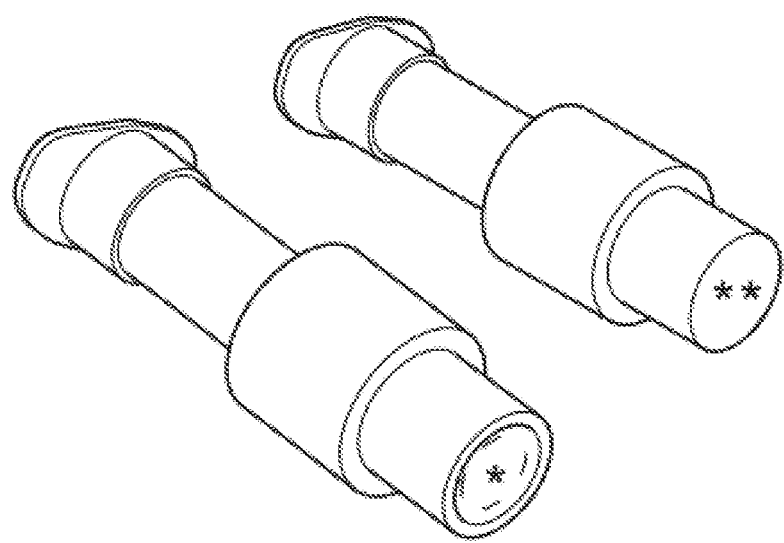
FIG. 3 shows an applicator tip having a concave end indicated by * on the left hand side and an applicator tip having a flat surface at the end indicated by ** on the right hand side.

A prototype applicator tip as shown in FIG. 3 (left hand picture) was made using polyolefin/polyester fibres which were needle punched to form a non-woven entanglement. This material was further slit to the intended dimensions and shape. The material presents as a non-woven pad of hydrophilic fibres with a nominal pore volume of 81%. The tip was further combined with a plastic applicator tube through thermal welding.

Example 2—Testing of Applicator Tip

The applicator tip made in Example 1 (shown in FIG. 3, left hand picture) may be compared to an applicator tip that is identical to the applicator tip made in Example 1 except that the end of the tip is a flat surface and there is no concave part (shown in FIG. 3, right hand picture).

Application of a refrigerant to a wart using the two applicator tips may be compared to demonstrate an improvement in application when using the applicator tip made in Example 1 compared to the applicator tip having no concave part.

Embodiments as described in the present application are also given below in the following numbered statements:
1. A device for treating a skin lesion, wherein the device comprises:
   a container for holding a skin lesion treatment agent;
   an applicator tube; and
   an applicator tip;
   wherein the applicator tube is attached to the container and the applicator tip in a manner to allow passage of a skin lesion treatment agent from the container to the applicator tip;
   wherein the applicator tip is made from a material that absorbs a skin lesion treatment agent; and
   wherein at least part of the exposed surface of the applicator tip is concave.
2. The device of statement 1, wherein a skin lesion treatment agent is present in the container.
3. The device of statement 1 or 2, wherein the skin lesion treatment agent is a refrigerant.
4. The device of any preceding statement, wherein the skin lesion is selected from warts, keratoses, achrocordon, molluscum contagiosum, age spots, dermatofibroma, keloids, granuloma annulare, porokeratosis plantaris, angiomas, lentigo maligna, keratocanthoma, basal cell, Bowen's disease, lentigo discreta, chondrodermatitis, epithelial nevus, leokoplakia, granuloma pyogenicum, moles, nodules, skin tags, and Kaposi's sarcoma.
5. The device of any preceding statement, wherein the skin lesion is a wart.
6. The device of any preceding statement, wherein the applicator tube is permanently or reversibly attached to the container.
7. The device of any preceding statement, wherein one part of the surface of the applicator tip is concave.
8. The device of any preceding statement, wherein at least one concave part, for example the concave part, of the surface of the applicator tip is located at the exposed end of the applicator tip.
9. The device of any preceding statement, wherein the applicator tip is made from a porous material.
10. The device of any preceding statement, wherein the applicator tip is made from a material having a density equal to or greater than about 0.1 g/cm$^3$ and/or equal to or less than about 0.4 g/cm$^3$.
11. The device of any preceding statement, wherein the applicator tip is made from a hydrophilic material.
12. The device of any preceding statement, wherein the applicator tip is made from a foam material, a non-woven material, a woven or knitted fabric, a spacer material, or a combination thereof.
13. The device of any preceding statement, wherein the applicator tip is made from a non-woven material comprising a blend of polyolefin and polyester fibres.
14. The device of any preceding statement, wherein the applicator tip has a pore volume equal to or greater than about 10% and/or equal to or less than about 90%.
15. The device of any preceding statement, wherein the applicator tip has a pore volume from about 75% to about 85%.
16. The device of any preceding statement, wherein the applicator tip has the overall shape of a cylinder, a cuboid or a prism.
17. The device of any preceding statement, wherein the applicator tip has a length equal to or greater than about 0.5 cm and/or equal to or less than about 2.0 cm.
18. The device of any preceding statement, wherein the applicator tip has a length of from about 1.0 cm to about 1.5 cm.
19. The device of any preceding statement, wherein the applicator tip has a diameter at its widest point equal to or greater than about 0.4 cm and/or equal to or less than about 0.9 cm.
20. The device of any preceding statement, wherein the applicator tip has a diameter at its widest point from about 0.5 cm to about 0.7 cm.
21. The device of any preceding statement, wherein the concave part of the surface of the applicator tip is a single curved face.

22. The device of any of statements 1 to 20, wherein the concave part of the surface of the applicator tip comprises a plurality of flat faces.
23. The device of any of statements 1 to 20, wherein the concave part of the surface of the applicator tip has the shape of a cylinder or an elliptical cylinder.
24. The device of any preceding statement, wherein the depth of the concave part of the surface of the applicator tip is equal to or greater than about 0.1 cm and/or equal to or less than about 1.0 cm.
25. The device of any preceding statement, wherein the depth of the concave part of the surface of the applicator tip is from about 0.2 cm to about 0.5 cm.
26. The device of any preceding statement, wherein the diameter of the widest part of the concave part of the surface of the applicator tip is equal to or greater than about 0.2 cm and/or equal to or less than about 0.9 cm.
27. The device of any preceding statement, wherein the diameter of the widest part of the concave part of the surface of the applicator tip is from about 0.3 cm to about 0.6 cm.
28. The device of any preceding statement, wherein the container is a pressurized container.
29. The device of any preceding statement, wherein the container comprises a trigger that causes release of the skin lesion treatment agent when activated.
30. The device of any preceding statement for use in treating a skin lesion, for example wherein the skin lesion is as defined in statement 4 or 5.
31. A kit for making a device for treating a skin lesion, wherein the kit comprises:
    a container for holding a skin lesion treatment agent;
    an applicator tube configured to hold an applicator tip and to allow passage of a skin lesion treatment agent from the container to the applicator tip; and
    an applicator tip made from a material that absorbs a skin lesion treatment agent;
    wherein at least part of the surface of the applicator tip is concave.
32. The kit of statement 31, wherein a skin lesion treatment agent is present in the container.
33. The kit of statement 31 or 32, wherein the skin lesion treatment agent is a refrigerant.
34. The kit of any of statements 31 to 33, wherein the skin lesion is selected from warts (including verrucas/plantar warts, periungual warts, and verruca vulgaris/common wart), keratoses, achrocordon, molluscum contagiosum, age spots, dermatofibroma, keloids, granuloma annulare, porokeratosis plantaris, angiomas, lentigo maligna, keratocanthoma, basal cell, Bowen's disease, lentigo discreta, chondrodermatitis, epithelial nevus, leokoplakia, granuloma pyogenicum, moles, nodules, skin tags, and Kaposi's sarcoma.
35. The kit of any of statements 31 to 34, wherein the skin lesion is a wart.
36. The kit of any of statements 31 to 35, wherein the applicator tube is permanently or reversibly attached to the container.
37. The kit of any of statements 31 to 36, wherein one part of the applicator tip is concave.
38. The kit of any of statements 31 to 37, wherein at least one concave part, for example the concave part, of the surface of the applicator tip is located at an end of the applicator tip.
39. The kit of any of statements 31 to 38, wherein the applicator tip is made from a porous material.
40. The kit of any of statements 31 to 39, wherein the applicator tip is made from a material having a density equal to or greater than about $0.1 \text{ g/cm}^3$ and/or equal to or less than about $0.4 \text{ g/cm}^3$.
41. The kit of any of statements 31 to 40, wherein the applicator tip is made from a hydrophilic material.
42. The kit of any of statements 31 to 41, wherein the applicator tip is made from a foam material, a non-woven material, a woven or knitted fabric, a spacer material, or a combination thereof.
43. The kit of any of statements 31 to 42, wherein the applicator tip is made from a non-woven material comprising a blend of polyolefin and polyester fibres.
44. The kit of any of statements 31 to 43, wherein the applicator tip has a pore volume equal to or greater than about 10% and/or equal to or less than about 90%.
45. The kit of any of statements 31 to 44, wherein the applicator tip has a pore volume from about 75% to about 85%.
46. The kit of any of statements 31 to 45, wherein the applicator tip has the overall shape of a cylinder, a cuboid or a prism.
47. The kit of any of statements 31 to 46, wherein the applicator tip has a length equal to or greater than about 0.5 cm and/or equal to or less than about 2.0 cm.
48. The kit of any of statements 31 to 47, wherein the applicator tip has a length of from about 1.0 cm to about 1.5 cm.
49. The kit of any of statements 31 to 48, wherein the applicator tip has a diameter at its widest point equal to or greater than about 0.4 cm and/or equal to or less than about 0.9 cm.
50. The kit of any of statements 31 to 49, wherein the applicator tip has a diameter at its widest point from about 0.5 cm to about 0.7 cm.
51. The kit of any of statements 31 to 50, wherein the concave part of the surface of the applicator tip is a single curved face.
52. The kit of any of statements 31 to 50, wherein the concave part of the surface of the applicator tip comprises a plurality of flat faces.
53. The kits of any of statements 31 to 50, wherein the concave part of the surface of the applicator tip has the shape of a cylinder or an elliptical cylinder.
54. The kit of any of statements 31 to 53, wherein the depth of the concave part of the surface of the applicator tip is equal to or greater than about 0.1 cm and/or equal to or less than about 1.0 cm.
55. The kit of any of statements 31 to 54, wherein the depth of the concave part of the surface of the applicator tip is from about 0.2 cm to about 0.5 cm.
56. The kit of any of statements 31 to 55, wherein the diameter of the widest part of the concave part of the surface of the applicator tip is equal to or greater than about 0.2 cm and/or equal to or less than about 0.9 cm.
57. The kit of any of statements 31 to 56, wherein the diameter of the widest part of the concave part of the surface of the applicator tip is from about 0.3 cm to about 0.6 cm.
58. The kit of any of statements 31 to 57, wherein the container is a pressurized container.
59. The kit of any of statements 31 to 58, wherein the container comprises a trigger that causes release of the skin lesion treatment agent when activated.
60. The kit of any of statements statement 31 to 59, wherein the kit is for making a device of any of statements 1 to 29.

61. The kit of any of statements 31 to 60 for use in treating a skin lesion, for example wherein the skin lesion is as defined in statement 4 or 5.
62. An applicator tip made from a material that absorbs a skin lesion treatment agent, wherein at least part of the surface of the applicator tip is concave.
63. The applicator tip of statement 62, wherein the skin lesion treatment agent is a refrigerant.
64. The applicator tip of statement 62 or 63, wherein one part of the surface of the applicator tip is concave.
65. The applicator tip of any of statements 62 to 64, wherein at least one concave part of the surface of the applicator tip is located at an end of the applicator tip.
66. The applicator tip of any of statements 62 to 65, wherein the applicator tip is made from a porous material.
67. The applicator tip of any of statements 62 to 66, wherein the applicator tip is made from a material having a density equal to or greater than about 0.1 g/cm$^3$ and/or equal to or less than about 0.4 g/cm$^3$.
68. The applicator tip of any of statements 62 to 67, wherein the applicator tip is made from a hydrophilic material.
69. The applicator tip of any of statements 62 to 68, wherein the applicator tip is made from a foam material, a non-woven material, a woven or knitted fabric, a spacer material, or a combination thereof.
70. The applicator tip of any of statements 62 to 69, wherein the applicator tip is made from a non-woven material comprising a blend of polyolefin and polyester fibres.
71. The applicator tip of any of statements 62 to 70, wherein the applicator tip has a pore volume equal to or greater than about 10% and/or equal to or less than about 90%.
72. The applicator tip of any of statements 62 to 71, wherein the applicator tip has a pore volume from about 75% to about 85%.
73. The applicator tip of any of statements 62 to 72, wherein the applicator tip has the overall shape of a cylinder, a cuboid or a prism.
74. The applicator tip of any of statements 62 to 73, wherein the applicator tip has a length equal to or greater than about 0.5 cm and/or equal to or less than about 2.0 cm.
75. The applicator tip of any of statements 62 to 74, wherein the applicator tip has a length of from about 1.0 cm to about 1.5 cm.
76. The applicator tip of any of statements 62 to 75, wherein the applicator tip has a diameter at its widest point equal to or greater than about 0.4 cm and/or equal to or less than about 0.9 cm.
77. The applicator tip of any of statements 62 to 76, wherein the applicator tip has a diameter at its widest point from about 0.5 cm to about 0.7 cm.
78. The applicator tip of any of statements 62 to 77, wherein the concave part of the surface of the applicator tip of the applicator tip is a single curved face.
79. The applicator tip of any of statements 62 to 77, wherein the concave part of the surface of the applicator tip of the applicator tip comprises a plurality of flat faces.
80. The applicator tip of any of statements 62 to 77, wherein the concave part of the surface of the applicator tip has the shape of a cylinder or an elliptical cylinder.
81. The applicator tip of any of statements 62 to 80, wherein the depth of the concave part of the surface of the applicator tip is equal to or greater than about 0.1 cm and/or equal to or less than about 1.0 cm.
82. The applicator tip of any of statements 62 to 81, wherein the depth of the concave part of the surface of the applicator tip is from about 0.2 cm to about 0.5 cm.
83. The applicator tip of any of statements 62 to 82, wherein the diameter of the widest part of the concave part of the surface of the applicator tip is equal to or greater than about 0.2 cm and/or equal to or less than about 0.9 cm.
84. The applicator tip of any of statements 62 to 83, wherein the diameter of the widest part of the concave part of the surface of the applicator tip is from about 0.3 cm to about 0.6 cm.
85. The applicator tip of any of statements 62 to 84 for use in treating a skin lesion, for example wherein the skin lesion is as defined in statement 4 or 5.
86. The applicator tip of any of statements 62 to 85, wherein the applicator tip is for use in a device of any of statements 1 to 29 or a kit of any of statements 30 to 59.
87. A method of treating a skin lesion using the device of any of statements 2 to 30, wherein the method comprises:
    releasing the skin lesion treatment agent from the container through the applicator tube to the applicator tip; and
    contacting the skin lesion with the concave part of the surface of the applicator tip.
88. Use of an applicator tip of any of statements 62 to 86 in the manufacture of a device or kit for treating a skin lesion.
89. The use of statement 88, wherein the device is a device of any of statements 1 to 30 and/or the kit is a kit of any of statements 31 to 61.
90. The method of statement 87 or the use of statement 88 or 89, wherein the skin lesion is selected from warts (including verrucas/plantar warts, periungual warts, and verruca vulgaris/common wart), keratoses, achrocordon, molluscum contagiosum, age spots, dermatofibroma, keloids, granuloma annulare, porokeratosis plantaris, angiomas, lentigo maligna, keratocanthoma, basal cell, Bowen's disease, lentigo discreta, chondrodermatitis, epithelial nevus, leokoplakia, granuloma pyogenicum, moles, nodules, skin tags, and Kaposi's sarcoma.
91. The method of statement 87 or the use of statement 88 or 89, wherein the skin lesion is a wart.

The foregoing broadly describes certain embodiments of the present invention without limitation. Variations and modifications as will be readily apparent to those skilled in the art are intended to be within the scope of the present invention as defined in and by the appended claims.

The invention claimed is:
1. A device for treating a skin lesion, wherein the device comprises:
    a container for holding a skin lesion treatment agent;
    an applicator tube including a channel extending therethrough; and
    an applicator tip;
    wherein the applicator tube is attached to the container and the applicator tip in a manner to allow passage of the skin lesion treatment agent from the container to the applicator tip through the channel;

wherein the applicator tip comprises a porous material that absorbs the skin lesion treatment agent, the porous material having a pore volume ranging from about 50% to about 90%;

wherein a width of the channel of the applicator tube is less than a width of the applicator tip;

wherein an exposed surface of the applicator tip distal to the applicator tube comprises a continuous inwardly shaped face to form a concave indent for contacting the skin lesion; and wherein a length of the porous material between the applicator tube and the concave indent is less than a length of the porous material between the applicator tube and a distalmost end of the applicator tip.

2. The device of claim 1, wherein the skin lesion treatment agent is present in the container.

3. The device of claim 2, wherein the skin lesion treatment agent is a refrigerant.

4. The device of claim 1, wherein only one part of the exposed surface of the applicator tip is concave.

5. The device of claim 1, wherein the porous material of the applicator tip has a density equal to or greater than about 0.1 g/cm$^3$ and/or equal to or less than about 0.4 g/cm$^3$.

6. The device of claim 1, wherein the porous material of the applicator tip is hydrophilic.

7. The device of claim 1, wherein the pore volume of the porous material is from about 75% to about 85%.

8. The device of claim 1, wherein the length of the porous material between the applicator tube and the distalmost end of the applicator tip is from about 1.0 cm to about 1.5 cm and/or wherein the applicator tip has a diameter at its widest point from about 0.5 cm to about 0.7 cm.

9. The device of claim 1, wherein the continuous inwardly shaped face comprises a single curved face or a plurality of flat faces.

10. The device of claim 1, wherein the depth of the at least one concave part of the exposed surface of the applicator tip is from about 0.2 cm to about 0.5 cm and/or wherein the diameter of the widest part of the at least one concave part of the exposed surface of the applicator tip is from about 0.3 cm to about 0.6 cm.

11. The device of claim 1, wherein the porous material of the applicator tip comprises two woven or knitted fabric layers connected by spacer yarns or fibres.

12. A kit for making a device for treating a skin lesion, wherein the kit comprises:

a container for holding a skin lesion treatment agent;

an applicator tip comprising a porous material that absorbs the skin lesion treatment agent, the porous material having a pore volume ranging from about 50% to about 90%; and an applicator tube configured to hold the applicator tip and including a channel to allow passage of the skin lesion treatment agent from the container to the applicator tip;

wherein a width of the channel of the applicator tube is less than a width of the applicator tip;

wherein a surface of the applicator tip distal to the applicator tube includes comprises a continuous inwardly shaped face to form a concave indent;

wherein a length of the porous material between the applicator tube and the concave indent of the applicator tip is less than a length of the porous material between the applicator tube and a distalmost end of the applicator tip; and wherein the concave indent of the applicator tip is configured to contact the skin lesion.

13. The kit of claim 12, wherein the skin lesion treatment agent is present in the container.

14. The kit of claim 12, wherein the skin lesion treatment agent is a refrigerant.

15. The kit of claim 12, wherein the porous material of the applicator tip comprises two woven or knitted fabric layers connected by spacer yarns or fibres.

16. A method of treating a skin lesion using a device, wherein the device comprises:

a container holding a skin lesion treatment agent;

an applicator tube including a channel extending therethrough; and an applicator tip;

wherein the applicator tube is attached to the container and the applicator tip in a manner to allow passage of the skin lesion treatment agent from the container to the applicator tip through the channel;

wherein the applicator tip comprises a porous material that absorbs the skin lesion treatment agent, the porous material having a pore volume ranging from about 50% to about 90%; and wherein an exposed surface of the applicator tip distal to the applicator tube comprises a continuous inwardly shaped face to form a concave indent, a length of the porous material between the applicator tube and the concave indent being less than a length of the porous material between the applicator tube and a distalmost end of the applicator tip, wherein the method comprises:

releasing the skin lesion treatment agent from the container through the applicator tube to the applicator tip; and contacting the skin lesion with the concave indent of the exposed surface of the applicator tip.

17. The method of claim 16, wherein the skin lesion is selected from warts, keratoses, achrocordon, molluscum contagiosum, age spots, dermatofibroma, keloids, granuloma annulare, porokeratosis plantaris, angiomas, lentigo maligna, keratocanthoma, basal cell, Bowen's disease, lentigo discreta, chondrodermatitis, epithelial nevus, leokoplakia, granuloma pyogenicum, moles, nodules, skin tags, or Kaposi's sarcoma.

18. The method of claim 16, wherein the skin lesion is a plantar wart, a periungual wart, or a verruca vulgaris wart.

19. The method of claim 16, wherein the porous material of the applicator tip comprises two woven or knitted fabric layers connected by spacer yarns or fibres.

* * * * *